(12) United States Patent
Shi et al.

(10) Patent No.: US 9,172,743 B2
(45) Date of Patent: Oct. 27, 2015

(54) SCALABLE STORAGE SYSTEMS WITH LONGEST PREFIX MATCHING SWITCHES

(71) Applicant: Futurewei Technologies, Inc., Plano, TX (US)

(72) Inventors: Guangyu Shi, Cupertino, CA (US); Jianming Wu, Fremont, CA (US); Byung Choi, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 212 days.

(21) Appl. No.: 13/913,654

(22) Filed: Jun. 10, 2013

(65) Prior Publication Data

US 2014/0188981 A1    Jul. 3, 2014

Related U.S. Application Data (60) Provisional application No. 61/747,670, filed on Dec. 31, 2012, provisional application No. 61/784,783, filed on Mar. 14, 2013.

(51) Int. Cl.
 *H04L 29/08* (2006.01)

(52) U.S. Cl.
 CPC ............ *H04L 67/06* (2013.01); *H04L 67/1097* (2013.01)

(58) Field of Classification Search
 None
 See application file for complete search history.

(56) References Cited

U.S. PATENT DOCUMENTS

| | | | | |
|---|---|---|---|---|
| 6,675,163 | B1 * | 1/2004 | Bass et al. ............................. 1/1 |
| 6,711,152 | B1 * | 3/2004 | Kalmanek et al. ............ 370/351 |
| 6,826,613 | B1 * | 11/2004 | Wang et al. .................... 709/227 |
| 7,539,153 | B1 * | 5/2009 | Liang et al. .................... 370/255 |
| 8,605,722 | B1 * | 12/2013 | Sindhu et al. .................. 370/390 |
| 2002/0118682 | A1 * | 8/2002 | Choe ......................... 370/395.31 |
| 2003/0026246 | A1 * | 2/2003 | Huang et al. ................... 370/352 |
| 2004/0133577 | A1 * | 7/2004 | Miloushev et al. ............. 707/10 |
| 2004/0133606 | A1 * | 7/2004 | Miloushev et al. ........... 707/200 |
| 2004/0133607 | A1 * | 7/2004 | Miloushev et al. ........... 707/200 |
| 2004/0184441 | A1 * | 9/2004 | Wu et al. ........................ 370/351 |
| 2004/0243563 | A1 * | 12/2004 | Heiner et al. ...................... 707/3 |
| 2005/0078601 | A1 * | 4/2005 | Moll et al. ..................... 370/218 |
| 2005/0141519 | A1 * | 6/2005 | Rajgopal et al. ......... 370/395.32 |

(Continued)

FOREIGN PATENT DOCUMENTS

| | | |
|---|---|---|
| CN | 1859115 A | 11/2006 |
| CN | 101068163 A | 11/2007 |
| CN | 101227460 A | 7/2008 |

OTHER PUBLICATIONS

"Virtex-5 FPGA Data Sheet: DC and Switching Characteristics," Product Specification, XILINX, DS202 (v5.3), May 5, 2010, pp. 1-91.

(Continued)

*Primary Examiner* — Greg C Bengzon
(74) *Attorney, Agent, or Firm* — Conley Rose, P.C.; Grant Rodolph; Brandt D. Howell (57) ABSTRACT

A method performed by a switch, the method comprising receiving a request for a file from a client, wherein the file is located in a distributed storage system, extracting a directory for the file from the request, performing longest prefix matching (LPM) of the directory against a forwarding information base (FIB) to identify a port, wherein the FIB associates directories with ports of the switch, and forwarding the client request toward a server containing the file via the identified port, wherein the server is one of a plurality of servers in the distributed storage system.

9 Claims, 7 Drawing Sheets

(56) References Cited

U.S. PATENT DOCUMENTS

| | | | |
|---|---|---|---|
| 2006/0206603 A1* | 9/2006 | Rajan et al. | 709/223 |
| 2008/0256250 A1* | 10/2008 | Wakefield | 709/229 |
| 2008/0262990 A1* | 10/2008 | Kapoor et al. | 706/20 |
| 2010/0058027 A1* | 3/2010 | Gong et al. | 711/216 |
| 2010/0114889 A1* | 5/2010 | Rabii et al. | 707/737 |
| 2010/0124231 A1* | 5/2010 | Kompella | 370/401 |
| 2011/0032833 A1* | 2/2011 | Zhang et al. | 370/252 |
| 2011/0225168 A1* | 9/2011 | Burroughs et al. | 707/747 |
| 2011/0296051 A1* | 12/2011 | Vange et al. | 709/238 |
| 2012/0317307 A1* | 12/2012 | Ravindran et al. | 709/238 |
| 2013/0246651 A1* | 9/2013 | Keen et al. | 709/238 |
| 2014/0023076 A1* | 1/2014 | Calo et al. | 370/392 |
| 2014/0122791 A1* | 5/2014 | Fingerhut et al. | 711/108 |
| 2014/0153573 A1* | 6/2014 | Ramesh et al. | 370/392 |

OTHER PUBLICATIONS

Foreign Communication From a Counterpart Application, PCT Application No. PCT/CN2013/091094, International Search Report dated Apr. 3, 2014, 6 pages.

Foreign Communication From a Counterpart Application, PCT Application No. PCT/CN2013/091094, Written Opinion dated Apr. 3, 2014, 3 pages.

* cited by examiner

SCALABLE STORAGE SYSTEMS WITH LONGEST PREFIX MATCHING SWITCHES

CROSS-REFERENCE TO RELATED APPLICATIONS

The present application claims priority to U.S. Provisional Patent Application No. 61/747,670 filed Dec. 31, 2012 by Guangyu Ski, et al. and entitled "A Method of Building Extremely Scalable Storage Systems with Longest Prefix Matching Switches" and U.S. Provisional Patent Application No. 61/784,783 filed Mar. 14, 2013 by Guangyu Shi, et al. and entitled "A Method of Building Extremely Scalable Storage Systems with Longest Prefix Matching Switches", which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network or distributed storage systems are useful for providing a data repository for clients with higher capacity and faster access in order to meet rising demands. Many distributed storage systems consist of two kinds of nodes: servers (e.g., a conventional computer) and switches (e.g. Ethernet or InfiniBand). The switches implement transparent communication channels for the servers. A Distributed File System (DFS) may span multiple back-end storage servers to provide high capacity and fast access, while offering a unified interface to clients by appearing as a single server. Clients may name the file content using either the portable operating system interface (POSIX) file system naming format or a binary flat format.

A storage system may have one or more components to understand the file name and determine which server stores the file. That is, a storage system may have one or more components to map a file name to a server identity or location where the file resides. In a typical Network Attached System (NAS) or DFS, the mapping may be implemented by one or more metadata servers. Each file stored in the system should have an entry in the metadata server(s). For most key-value storage systems, a single-hop or multiple-hop distributed hash table (DHT) may be used. Each storage server may have to maintain the routing table, causing the complexity to be based on the number of storage servers and the number of files. When the system expands, a primary challenge to scalability includes maintaining the routing table in metadata servers or DHT nodes. Therefore, there is a need to build scalable distributed storage systems in order to overcome reliance on a centralized metadata server or indexer for data storage. Also, due to increasing storage demands, there is a need for storage systems with increased scalability.

SUMMARY

In one embodiment, the disclosure includes a method performed by a switch, the method comprising receiving a request for a file from a client, wherein the file is located in a distributed storage system, extracting a directory for the file from the request, performing longest prefix matching (LPM) of the directory against a forwarding information base (FIB) to identify a port, wherein the FIB associates directories with ports of the switch, and forwarding the client request toward a server containing the file via the identified port, wherein the server is one of a plurality of servers in the distributed storage system.

In another embodiment, the disclosure includes a switch comprising a processor configured to acquire a request for a file from a client, wherein the file is located in a distributed storage system, extract a directory for the file from the request, and perform LPM of the directory against a FIB to identify a port, wherein the FIB associates directories with ports of the switch; and a transmitter coupled to the LPM module and configured to forward the client request toward a server containing the file via the identified port, wherein the server is one of a plurality of servers in the distributed storage system.

In yet another embodiment, the disclosure includes a method comprising receiving a user datagram protocol (UDP) request from a client, wherein the UDP request comprises a requested file and a directory for the file, performing LPM of the directory against an index table to determine a port; and creating an entry in a flow table that associates the client and the port.

In yet another embodiment, the disclosure includes a method in a server in a distributed storage system, wherein the server stores a part of a directory tree, the method comprising measuring a load, determining that the load is greater than a threshold, select a nearest server as a recipient of a first part of the part of the directory tree, transferring the first part to the nearest server, and sending a message to a nearest longest prefix matching (LPM) switch to indicate that the first part was transferred.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, methods, and apparatuses for increasing scalability and reducing cost of distributed storage systems by using longest prefix matching (LPM) switches to map file or content names to storage devices. LPM switches may conduct routing or switching based on a longest prefix matching of a directory path and file name. This matching may be utilized in a POSIX file system naming convention (e.g., the directory-subdirectory-file structure in any modern operating system) and/or a binary 0-1 flat naming convention, as used in many Distributed Hash Table (DHT) implementations. The LPM switch may be employed in addition to conventional media access control (MAC) or internet protocol (IP) prefix based routing/switching. Prefix aggregation may be utilized to reduce sizes of forwarding tables and save space. Furthermore, a load balancing mechanism may mitigate overloaded servers by spreading out data among multiple servers while keeping prefix aggregation. The use of LPM switches may eliminate the need for index servers as compared with conventional distributed storage architectures.

Figure 1:
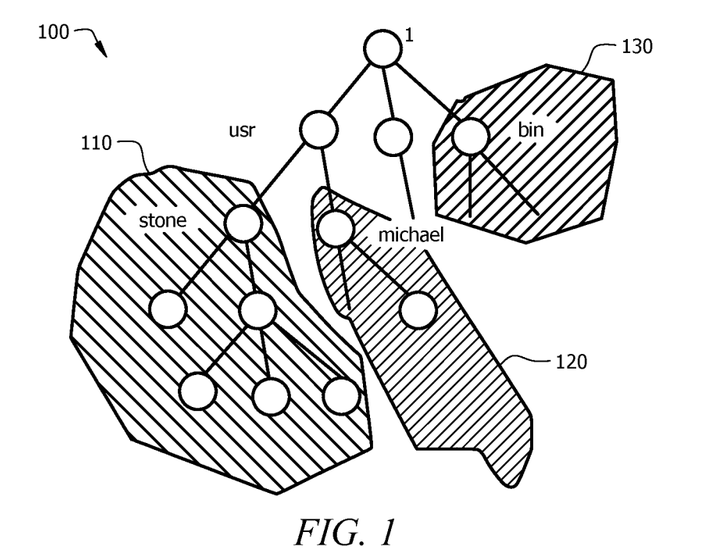
FIG. 1 is an embodiment of prefix-based server assignment in a POSIX file system tree.

FIG. 1 illustrates an embodiment of prefix-based directory groupings in a POSIX file system tree 100. The file system 100 may comprise a plurality of directories, subdirectories, and files within these directories. Each of the directory groupings 110, 120, 130 may be assigned to a different storage server. Any number of servers may be used in a file storage system. A storage server may be any device accessible by a network and having a memory device for storing data. A storage server may be responsible for one or more subdirectories in a hierarchal file system. For example, a first server may manage all of the files and subdirectories under the path /usr/stone/, a second server may manage all of the files and subdirectories under the path /usr/Michael/, and a third server may manage all of the files and subdirectories under the path /bin/. This implementation may allow the first level of a prefix aggregation mechanism in which a prefix such as /usr/stone/ may represent the files and subdirectories under the path of the same name.

Figure 2:
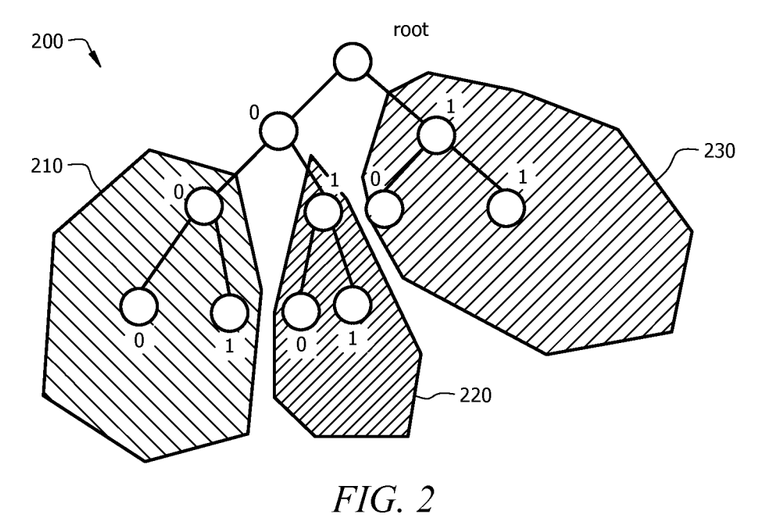
FIG. 2 is an embodiment of a binary 0-1 flat name key-value store file system tree.

In an alternate embodiment, a storage server may manage one range of a DHT naming space, in which a binary 0-1 flat naming convention may be used. FIG. 2 shows an embodiment of prefix-based directory groupings in a binary 0-1 flat name key-value store file system tree 200. The file system 200 may comprise a plurality of directories, subdirectories, and files within these directories. Each of the different directory groupings 210, 220, 230 may manage a range of DHT naming space. A 0-1 flat name space may be represented by a prefix. For example, a "010001" may represent the range [0100010000, 0100100000]. By way of further example, a first server may manage all of the files and subdirectories under the host range 00, a second server may manage all of the files and subdirectories under the host range 01, and a third server may manage all of the files and subdirectories under the host range 1.

Both file system trees in FIG. 1 and FIG. 2 enable the routing/switching function to only need to know the mapping between servers and corresponding prefixes. Thus, the complexity of the system may be reduced to $O(N_{svr})$, where $N_{svr}$ is the number of servers. Typical personal-computer-based servers may manage million to billions of files and objects with ease. As a result, $N_{svr}$ may be less than $N_f$ (the number of files) by ~8-10 magnitudes. If a block/sector number is implemented as a key in FIG. 2's embodiment, the key-value store may also act as a conventional storage access network (SAN).

Once storage servers have been assigned accordingly (e.g., server assignments such as in FIG. 1), the servers may announce the prefixes they are responsible for to the switches, which may normally be the first hop switches they are connected to. The first hop switch may directly forward this message to other switches. In another embodiment, the switch may perform further aggregation such as in FIG. 2's binary 0-1 flat name file system. For example, the "00" server and the "01" server may happen to be connected to the same switch. In this case, the switch may decide to publish the aggregated prefix "0" to other switches, instead of publishing "00" and "01" as two routing entries.

An LPM module in a switch may conduct the routing/switching based on longest prefix matching, in addition to conventional MAC or IP prefix-based routing/switching. For example, a client may request some content, and the name may be checked with a forwarding information base (FIB), depending on if it is a POSIX file name or a binary 0-1 flat name. An FIB may be a forwarding table used to determine a destination of where a received packet should be forwarded. The longest prefix matching principle may be used to find an egress port. The LPM switch may then forward the client request to the right server. A longer prefix match may increase the accuracy in finding the appropriate server in a storage system network.

Figure 3:
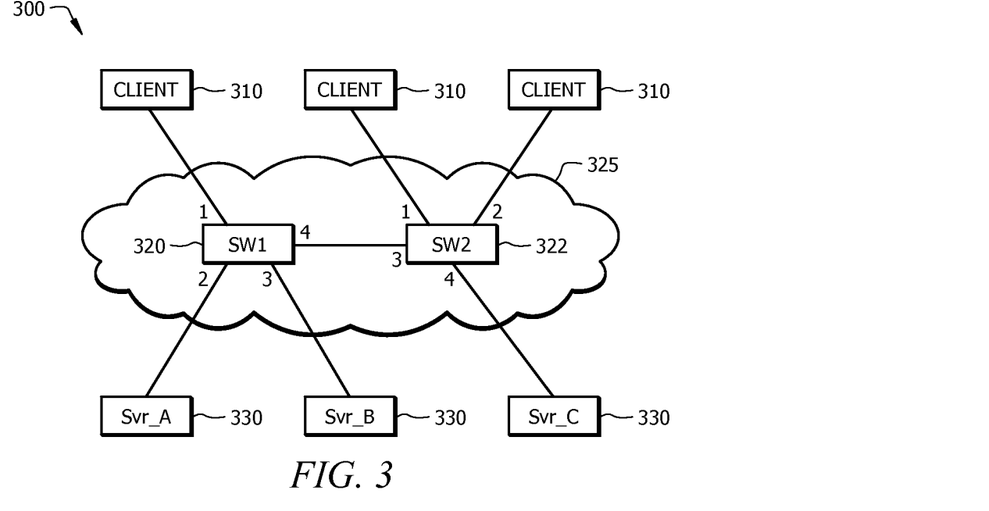
FIG. 3 is an embodiment of a LPM switch-based storage system.

FIG. 3 illustrates an embodiment of a LPM switch-based storage system 300. The system 300 may comprise a plurality of clients 310, switch 1 (SW1) 320, switch 2 (SW2) 322, and a plurality of servers 330 connected via a network 325 as shown in FIG. 3. Although only two switches 320 and 322, three clients 310, and three servers 330 are shown for illustrative purposes, any number of each component may be used in a LPM switch-based system. A LPM switch may be built alone as a new component or by augmenting existing Ethernet switches or IP routers. The network 325 may comprise one or more switches (e.g., 320, 322) which may be file system-specific LPM systems. The numbers 1-4 in system 300 may indicate ingress/egress ports of the switches 320, 322. A port may have both ingress and egress functionality and may be referred to herein as an ingress port or egress port depending on the context. A client 310 may be an application on a device that has remote data storage needs. The device may be as examples, a desktop computer, a tablet, a laptop, or a smart phone. A server 330 may host one or more subdirectories of a file system tree. One server may host a root directory. Table 1 shows an example of a prefix tree assignment in which servers 330 are assigned to different hosting directories.

TABLE 1

An example of a server hosting map

| Server_ID | Hosting Directories |
|---|---|
| Svr_A | / |
| Svr_B | /home |
| Svr_C | /root, /home/dfs |

Following prefix tree assignment, FIBs on the exemplary LPM switches (e.g. such as switches 320, 322 in FIG. 3) may be organized as seen in Tables 2 and 3. Tables 2 and 3 correspond to FIG. 3's LPM switch 1 320 and LPM switch 2 322, respectively. From these forwarding tables, the LPM switch may know which egress port to forward frames to, depending on the prefix of the file.

TABLE 2

An example of a forwarding table of LPM switch 1

| Prefix | Egress Port |
|---|---|
| / | 2 |
| /home | 3 |
| /home/dfs | 4 |
| /root | 4 |

TABLE 3

An example of a forwarding table of LPM switch 2

| Prefix | Egress Port |
|---|---|
| / | 3 |
| /home | 3 |
| /home/dfs | 4 |
| /root | 4 |

For example, a client 310 may send SW1 320 a request asking for some files under the path "/home/dfs///." SW1 320 may choose egress port 4 based on Table 2's forwarding information. Port 4 may be chosen because it shares the longest prefix with the request "/home/dfs/" in comparison to the other prefixes in the table. Based on this forwarding, the request may get one hop closer to a target destination (e.g., Svr_C 330). Next, SW2 322 may receive the forwarded request through its ingress port 3. It may use the same LPM mechanism to forward the received request to egress port 4, which connects to the target destination Svr_C 330. The target server may now respond to this request with the embedded client 310's MAC/IP address. The server may set up a new connection with the client such as a conventional transmission control protocol (TCP) connection. Further packets forwarded between the client and the server may not engage in LPM look-ups during this same session because the destination of the outgoing port has already been found.

In another embodiment, the storage system 300 may refer to a key-value object storage in addition to a file storage system embodiment. Table 4 represents a prefix tree assignment for a DHT key-value store scenario, in which servers 330 may be assigned to different hosting ranges. Tables 5 and 6 show the FIBs for the LPM switch 1 320 and LPM switch 2 322, respectively. SW1 320 may perform additional prefix aggregation, which may simplify the FIB in SW2 322 as seen in Table 6. The LPM mechanism for the key-value object storage may function similarly to the file system storage.

TABLE 4

An example of a server hosting map

| Server_ID | Hosting Ranges |
|---|---|
| Svr_A | 00 |
| Svr_B | 01 |
| Svr_C | 1 |

TABLE 5

An example of a forwarding table of LPM switch 1

| Prefix | Egress Port |
|---|---|
| 00 | 2 |
| 01 | 3 |
| 1 | 4 |

TABLE 6

An example of a forwarding table of LPM switch 2

| Prefix | Egress Port |
|---|---|
| 0 | 3 |
| 1 | 4 |

Figure 4:
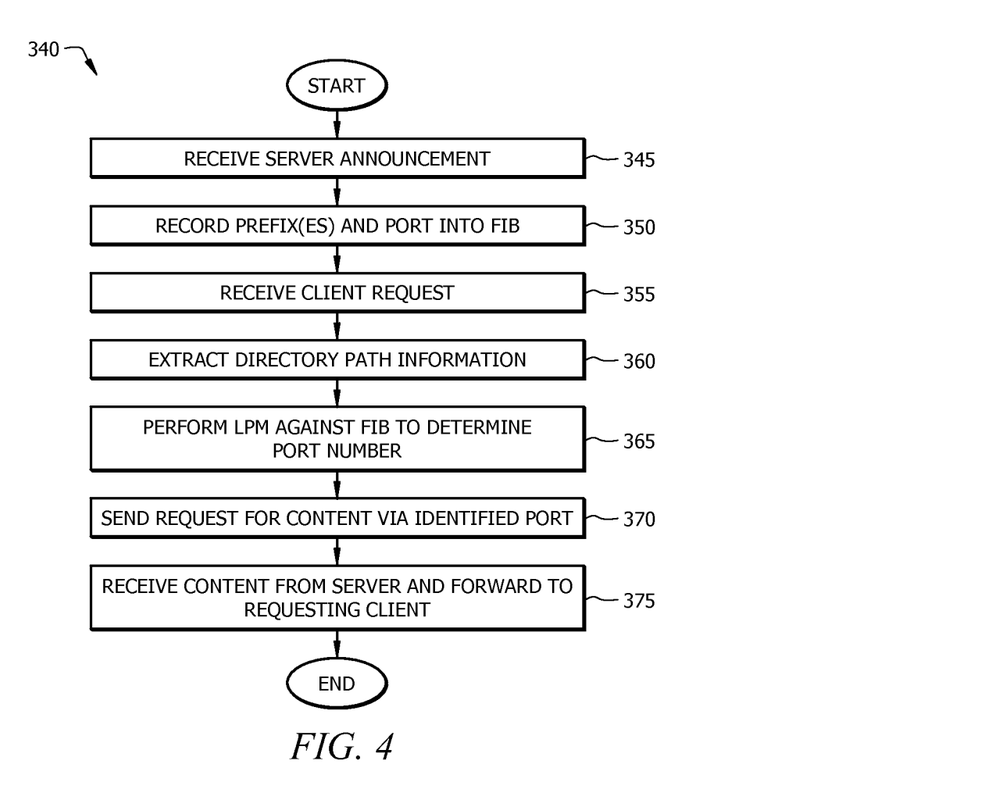
FIG. 4 is an embodiment of a method for retrieving content from a storage server via an LPM switch.

FIG. 4 is an embodiment of a method 340 for retrieving content from a storage server via a LPM switch. The method 340 may be performed in a LPM switch, such as LPM switch 320. In block 345, a server announcement may be received. The server announcement may contain directories and subdirectories for which a server is responsible. The server announcement may be received via a port on a LPM switch. In block 350, the prefixes of the various directories/subdirectories may be recorded in memory, such as in a FIB. Blocks 345 and 350 may be performed for each of a plurality of servers until complete directory information is obtained. Some server announcements may be received directly from servers directly attached to the LPM switch, and some server announcements may be received from servers via other LPM switches. After a FIB is constructed, client requests for content may be received. In block 355, a client request is received. The client request may be a message containing a filename and directory information corresponding to the filename. In block 360, the full path information for the filename is extracted. In block 365, LPM is performed by comparing the full path information against the FIB. The LPM result yields a port number though which the client request should be forwarded. In block 370, the client request may be transmitted via the identified port number. Finally, in block 375, the requested file may be received from the responsible server and forwarded to the requesting client. The requested file may be communicated via one data packet or a plurality of data packets.

Figure 5:
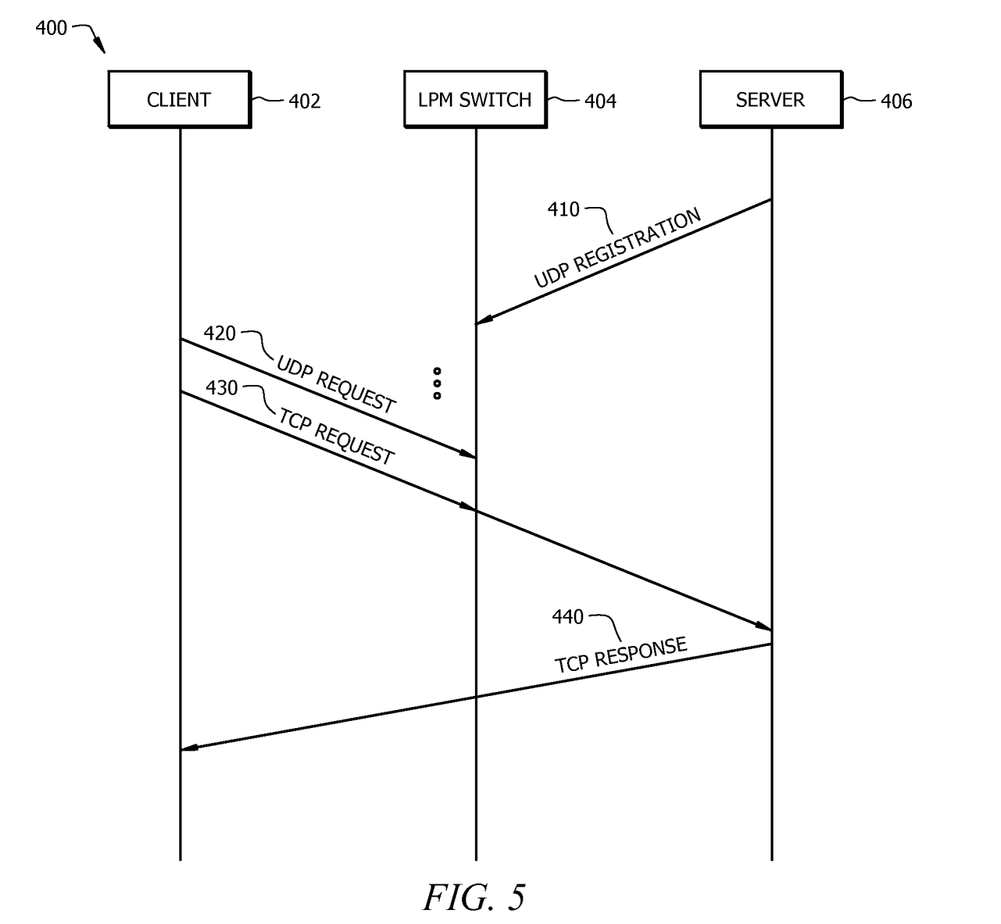
FIG. 5 is a protocol diagram illustrating an embodiment of signaling between a client, a LPM switch, and a server.

FIG. 5 is a protocol diagram 400 illustrating an embodiment of the signaling between a client 402, an LPM switch 404, and a server 406. Specifically, the protocol diagram 400 depicts the communication between components following a user request to obtain data from a server through a switch, where a plurality of such components may be interconnected in a network. The components in diagram 400 may be implemented in a storage system such as system 300, where components such as a client 310, switch 320, 322, and server 330 may be employed. Data may be transmitted in a payload between a client 402, LPM switch 404, server 406 in an Open System Interconnection (OSI) layer 4 protocol data unit (PDU). The OSI layer 4 PDU may be user datagram protocol (UDP) packets or transmission control protocol (TCP) packets.

During transmission with a LPM switch, the sequence of events in diagram 400 may commence at 410 with an initial registration of the server 406. A UDP packet containing server information may be received by the LPM switch 404. The contents may include, but not be limited to, directory paths and filenames located within a payload. The contents within a payload may be about 256 bytes.

From the UDP packet's payload, an entry in an index table may be created, comprising an index (IDX), port number, MAC, IP, and TCP addresses corresponding to each file. The index may be used as an identifier, whereas the port number may refer to a port located in a specific server. For example, if there are five files in Server A 330, then the IDX values may range from 0 to 4 for each of the files. Likewise, the port number may be 2 for all of the files if they are all located at the same port number (e.g., port 2) of the same server (e.g., Server A 330). The MAC, IP, and TCP addresses may be important for packet editing and OSI layer 4 forwarding.

Table 7 shows an example of an index table containing server information for a specific file. The values in the table serve as an illustration of the index, port, and MAC addresses obtained from a file request.

TABLE 7

An example of an index table during server registration
Index Table

| IDX | Port # | MAC | IP | TCP |
|---|---|---|---|---|
| 0 | 0 | 0118_8F29_1B00 | 0403_0201 | 1001 |

Following the addition to the index table, an entry in a segment table may also be created from the UDP packet payload. Table 8 shows an example of such a segment table with illustrated values. This table may provide the port number of the LPM switch side along with corresponding MAC addresses. SW-MAC may represent the MAC address for the switch side, while T-MAC signifies the MAC address of the target or final destination, which may be a server or a client.

TABLE 8

An example of a segment table during server registration
Segment Table

| Port # | SW-MAC | T-MAC |
|---|---|---|
| 0 | 011E_1D1C_1B1A | 0118_8F29_1B00 |

Furthermore, the LPM switch 404 may provision string and/or port lookup memories during server registration. The string and/or port lookup memories provisioning may use hashing algorithms with a Bloom filter to translate content data to reduce the size of the filename and port information. The hashing function and Bloom filter may be used to reduce the lookup memory space when storing string and port lookup information. Various hashing algorithms may be employed, such as hash(1) or hash(10) functions. In an embodiment, hashing may reduce the number of bytes of the payload content from 256 bytes to 3 bytes.

After completing server registration, the client may issue a request which internally generates two packets: a UDP request and a TCP request. A UDP request may be transmitted at 420 from the client 402 to the LPM switch 404. The UDP request may carry some of the content information (e.g., path and filename) which the LPM switch has already registered. The server information in an index table (such as Table 7) may be accessed by the LPM switch to determine the destination of the UDP request. LPM may be performed (using a table of indexes versus directories) to determine an index in the index table. The destination/outgoing port may be determined by looking up the port associated with the index in the index table. Once the destination/outgoing port has been determined, the LPM switch may create an entry in a flow table, which may comprise information regarding content associated memory from a client to a server (CAM-CS). Similarly, the LPM switch may make another entry in a different flow table, regarding content associated memory for a server to a client (CAM-SC).

Tables 9 and 10 show examples of such flow tables for CAM-CS and CAM-SC, respectively. The "S" in SMAC, SIP, and STCP signifies specific addresses for the source, while the "D" in DMAC, DIP, and DTCP represents addresses corresponding to the destination. The dual-ported random access memory (RAM) value may indicate an index for the corresponding server and a port for the client in Tables 9 and 10, respectively.

In an embodiment, the flow tables may store a certain number of bits and number of entries. For example, a 100x32 CAM-CS flow table may indicate a table with 32 entries, each of which is 100 bits, whereas a 200x32 CAM-SC table may denote a table with 32 entries, each of which is 200 bits.

The flow tables in Tables 9 and 10 may be an example of a FIB, similar to the FIBs displayed in Tables 2, 3, 5, and 6 above. Furthermore, the flow tables in tables 9 and 10 may be combined into one bidirectional flow table, containing entries for flow from the client to the server and vice-versa.

TABLE 9

An example of a CAM-CS flow table for client-server information
Flow Table
(CAM-CS: 100x32)

| SMAC | SIP | STCP | DPRAM (Index) |
|---|---|---|---|
| 48 | 32 | 16 | 10 |
| MA | IA | TA | 0 |

TABLE 10

An example of a CAM-SC flow table for server-client information
Flow Table
(CAM-SC: 200 x 32)

| SMAC | SIP | STCP | DMAC | DIP | DTCP | DPRAM (Out-Port) |
|---|---|---|---|---|---|---|
| 48 | 32 | 16 | 48 | 32 | 16 | 8 |
| MD | ID | TD | MC | IA | TA | 0 |

Shortly after the UDP request is sent (e.g., within a few seconds after the UDP request), a TCP request may be transmitted at 430 from the client 402. The LPM switch 404 may receive the TCP packet and perform OSI layer 4 switching. For example, the switch may check the corresponding flow table created from the UDP request to determine the destination of the packet using longest prefix matching. The target server information (e.g., an output port) may be obtained based on an entry in a client-server flow table, such as the one in Table 9. The LPM switch 404 may edit the TCP request if needed and subsequently forward the packet to server 406 according to the retrieved information.

After receiving client 402's TCP request, the server 406 may respond at 440 via the transmission of one or more TCP packets that convey the requested file or files. The server response may be sent to the LPM switch 404, which may check the server-client flow table (e.g., Table 10) and forward the packet(s) to the appropriate client that issued the command or request. In an embodiment, the LPM switch 404 may conduct OSI layer 4 switching for the server TCP response as discussed above.

Figure 6:
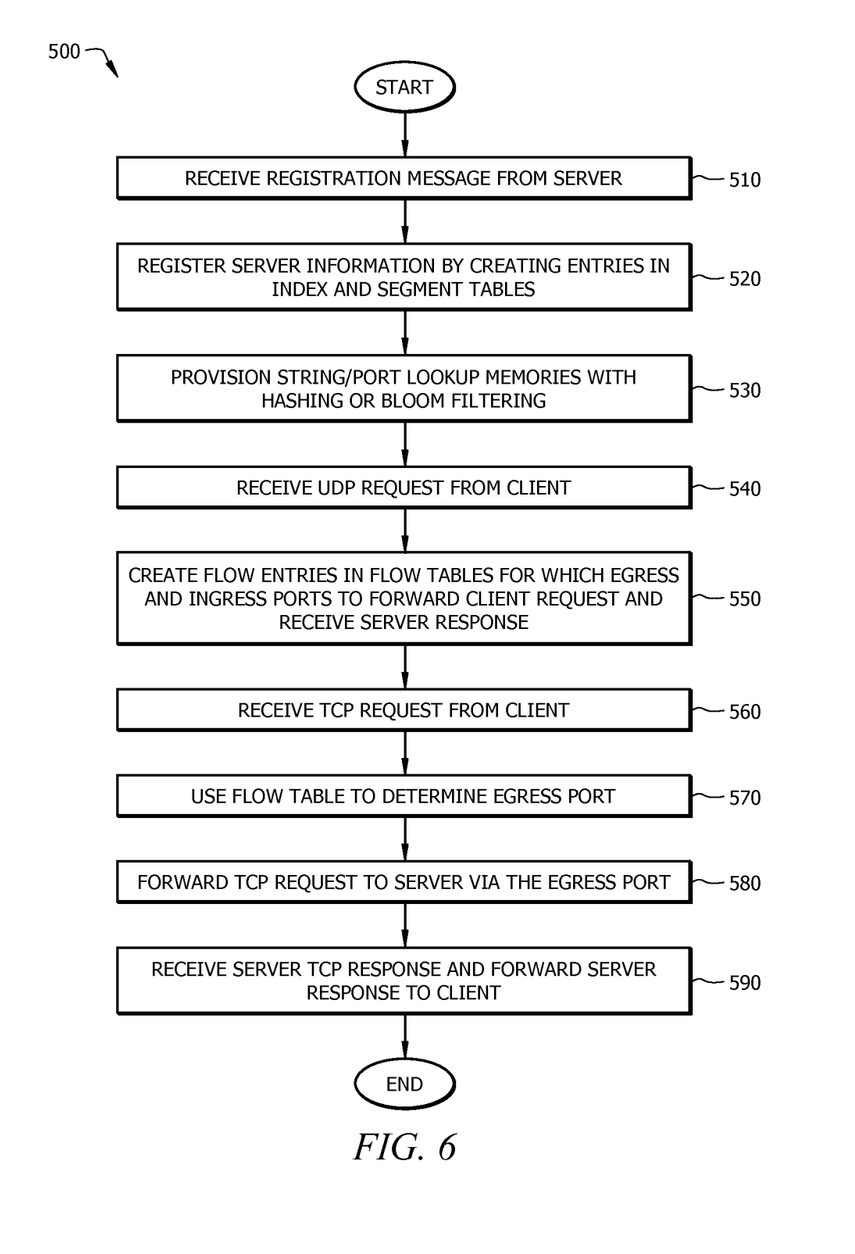
FIG. 6 is a flowchart of an embodiment of a LPM method.

FIG. 6 is a flowchart 500 of an embodiment of a longest prefix matching method. The steps of the flowchart 500 may be implemented in a data storage system with at least one client and at least one networking storage device, such as a server, whereas the system may be interconnected with at least one switch. For example, the blocks of the flowchart 500 may be performed in an LPM switch in a storage system, such as system 300 comprising a plurality of clients 310, a plurality of switches 320, 322, and a plurality of servers 330. The flowchart 500 begins in block 510, in which an LPM switch (e.g., the LPM switch 320, 322 in FIG. 3) may receive an initial UDP packet from a server. At block 520, the LPM switch may obtain server information from the UDP packet and register this information with entries in index and segment tables. An index table and segment table may be updated with port numbers, IDX values, MAC, IP, and TCP addresses for the destination of a future TCP request. Next in block 530, the LPM switch may provision string/port lookup memories. A hashing function and/or Bloom filter may be employed to reduce the number of bytes and save space in memory.

After server registration, the method continues in block 540, where the LPM switch may receive a request from a client in the form of a UDP packet. The request may comprise a requested file and a directory or pathname for the file. At block 550, the LPM switch may subsequently create flow entries in corresponding FIB or flow tables. One flow entry may include a location for an outgoing port to forward a packet from the client to the server. Another flow entry may be made for which an ingress port to utilize in receiving a packet from the server to forward to the client. These entries may be made in CAM-CS and CAM-SC flow tables, such as in Tables 9 and 10. Additionally, the entries in the separate FIB tables may be combined into one table to enable a bidirectional flow of packets from a client to a server and from a server to a client.

Next, in block 560, the LPM switch may receive a TCP packet from the client. At block 570, the LPM switch may use a flow table to determine an egress port for the packet. The LPM switch may then forward the received packet in block 580 to the target server via the identified egress port. The method ends with the LPM switch receiving and then transmitting a server TCP response to the client in block 590. The TCP response may comprise the file requested by the client. The LPM switch may determine which client to forward the packet to, based on the flow entry in a flow table.

In order for a client's request to reach the appropriate storage server, a switch may need to know the mappings between prefixes and egress ports. A longest prefix matching may then be executed by using a switch between the client request and a FIB. An LPM switch may perform longest prefix matching between the directory name of the file that needs to be retrieved and the entries of the FIB. The longest prefix matching itself may be performed using any conventional longest prefix matching algorithm. As described herein, Bloom filters and hash functions may be used to implement the longest prefix matching. A LPM switch may implement at least one of two new FIBs: <prefix of directory/subdirectories, next egress port> in a POSIX file system and <prefix of 0-1 series, next egress port> in a binary 0-1 flat name key-value store file system. When the client makes a request, the name may be a path to a file in a POSIX file system or a binary 0-1 flat name for an object in key-value store. The LPM switch may intercept this request, check the FIB accordingly, and decide which entry shares the longest prefix with the request. The request may then be forwarded to the appropriate egress port. In another embodiment, LPM switching may be implemented similarly for a DHT key-value store.

By way of further example, a LPM switch may comprise a request interception module and a longest prefix matching module. The request interception module may handle a client's request and a server's announcement or response. Before making a request, a client may not know which server to contact. A request may be sent to a virtual address which may be recognized by the LPM switches with the desired destination. Other methods for sending requests may also be implemented as long as the requests can be recognized and intercepted by the LPM switches. The client may not know an exact location of a server to contact for a certain request; however, the LPM switch may have the intelligence to connect a client to the appropriate server for each request. This may allow the client side to consider the distributed system as a local system, since the distributed property of the server cluster may be masked by the interconnected LPM switch network. After receiving a client request with an embedded name, the module may extract the content name and initiate LPM at the corresponding FIB. In another embodiment, the LPM switch's request interception module may also connect a server to a client for a server response. When a flow entry is made in a FIB regarding which egress port to forward a client request to, an additional flow entry may be made for a response from a server to a client. For a server announcement, the switch may record a prefix and a port from which the announcement came in into a FIB.

Figure 7:
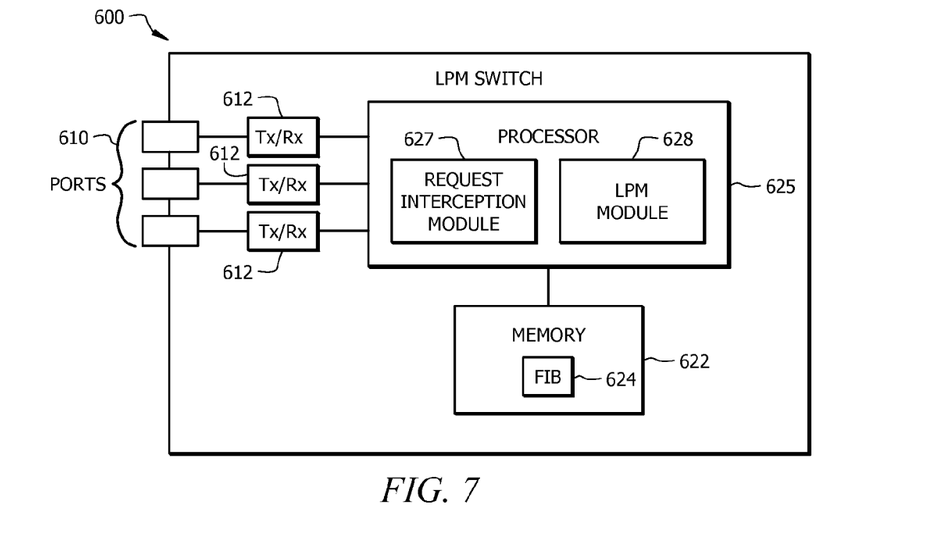
FIG. 7 is a schematic diagram of an embodiment of a LPM switch.

At least some of the features/methods described in the disclosure may be implemented in a network element. For instance, the features/methods of the disclosure may be implemented using hardware, firmware, and/or software installed to run on hardware. The network element may be any device that transports data through a network, e.g., a switch, router, bridge, server, client, etc. FIG. 7 illustrates an embodiment of an LPM switch 600, which may be any network element that transports and processes data through a network. For instance, the LPM switch 600 may be a content router or any apparatus or switch implementing the longest prefix matching schemes described above. The LPM switch 600 may be configured to implement or support the storage server assignment, prefix aggregation, and longest prefix matching strategies described above.

The LPM switch 600 may comprise one or more ports or faces 610 coupled to transceivers (Tx/Rx) 612. A transceiver 612 may comprise a transmitter and a receiver. A transceiver 612 may be coupled to a port 610 for transmitting and/or receiving frames from other nodes. One transceiver 612 may be coupled to a server in a distributed storage system for receiving messages from and transmitting messages to a server. For example, one transceiver 612 may be configured to perform blocks 345, 370, and/or 510 as well as forwarding content as described in block 375 and/or perform communication with the server 406 as shown in FIG. 5. A second transceiver 612 may be coupled to a client for receiving messages from and transmitting messages to the client. For example, the second transceiver 612 may be configured to perform block 355 or perform communication with the client 402 as shown in FIG. 5.

A processor 625 may be coupled to the transceivers 612 to process the frames and/or determine the nodes to which to send frames. The processor 625 may comprise one or more multi-core processors with a request interception module 627, a LPM module 628, and a memory module 622. The request interception module 627 may implement the aforementioned properties of a LPM switch, such as recognizing and intercepting requests from a client and/or a server. Module 627 may also connect a server to a client or vice-versa in order to transmit a request or a response. The LPM module 628 may conduct the routing/switching based on longest prefix matching while utilizing memory module 622, which may function as data stores, buffers, etc. The processor 625 may be implemented as one or more central processing unit (CPU) chips, cores (e.g., a multi-core processor), field-programmable gate arrays (FPGAs), application specific integrated circuits (ASICs), and/or digital signal processors (DSPs). The ports 610 may contain electrical and/or optical transmitting and/or receiving components. LPM switch 600 may be a routing component that makes routing decisions.

The memory module 622 may be any device for storing data, such as a cache, a random access memory (RAM), a read-only memory (ROM), or secondary storage, or any combination thereof. Secondary storage typically comprises one or more disk drives or tape drives and is used for non-volatile storage of data and as an over-flow data storage device if RAM is not large enough to hold all working data. Secondary storage may be used to store programs that are loaded into RAM when such programs are selected for execution. ROM is used to store instructions and perhaps data that are read during program execution. ROM is a non-volatile memory device that typically has a small memory capacity relative to the larger memory capacity of secondary storage. RAM is used to store volatile data and perhaps to store instructions. Access to both ROM and RAM is typically faster than to secondary storage, and access to cache is typically faster than any of the other types of memory. Mapping information may be maintained in a forward information base (FIB) 624 at the memory module 622. The FIB 624 may be used to house server information, such as segment, index, string and/or port lookup memories, and flow tables during a LPM method (e.g., FIG. 6).

It is understood that by programming and/or loading executable instructions onto the LPM switch 600, at least one of the processor 625 and the memory 622 are changed, transforming the LPM switch 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 8:
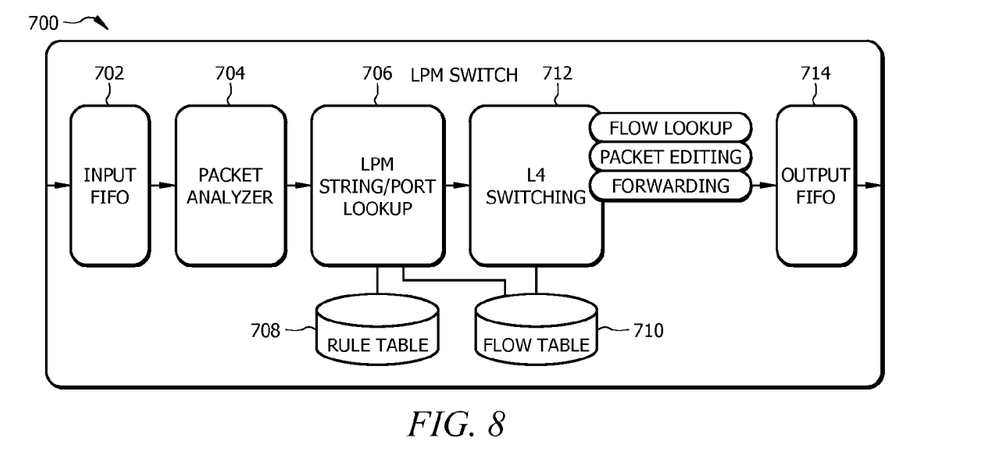
FIG. 8 is schematic diagram of an embodiment of a LPM switch implemented on a field-programmable gate array (FPGA) chip.

FIG. 8 illustrates a block diagram of an embodiment of a LPM switch implemented on a field-programmable gate array (FPGA) chip 700, such as a XILINX VIRTEX-5 FPGA. The chip 700 may comprise a first in, first out (FIFO) input 702, packet analyzer 704, LPM string/port lookup block 706, L4 switching block 712, and a FIFO output 714. During transmission, the FPGA chip 700 may receive packets at input 702, and the content of each packet may be assessed by the packet analyzer 704. The LPM string/port lookup block 706 may perform prefix matching methods on the packet content as described in FIG. 5, in which MAC, IP, and TCP addresses and port numbers for each file may be documented in corresponding tables. The LPM string/port lookup block 706 may further comprise a rule table 708 and a flow table 710. The rule table 708 may be employed for extracting source information for a flow table, while the flow table may contain entries for client-server and server-client flow. The L4 switching block 712 may conduct flow lookup, packet editing, and forwarding of the received by a LPM switch. The packet may then be transmitted to its destination via the FIFO output 714. In an embodiment, the LPM switch 700 may implemented on a NetFPGA card.

Figure 9:
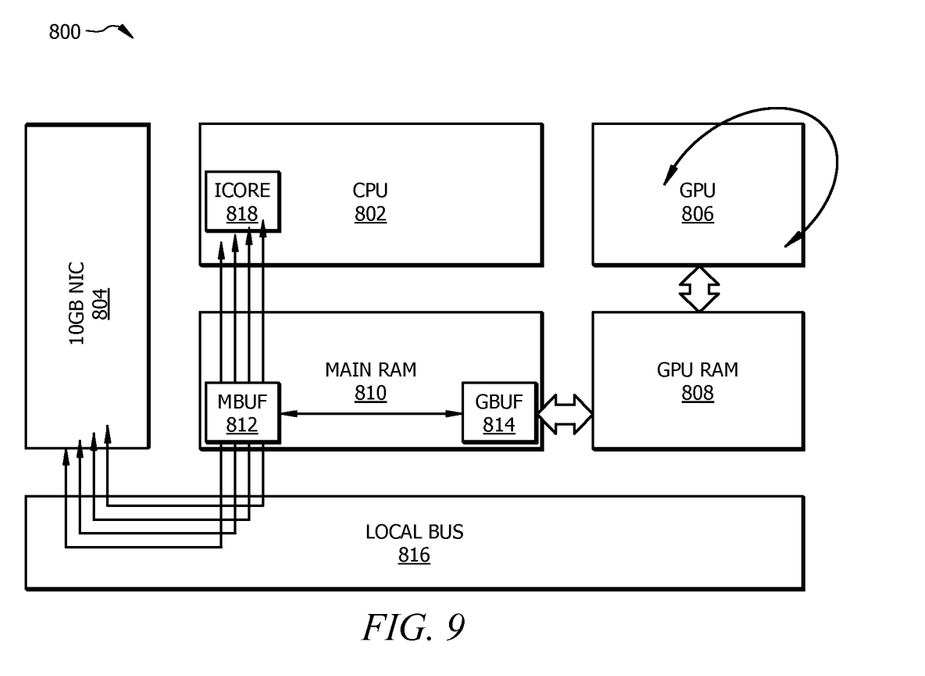
FIG. 9 is a schematic diagram of an embodiment of a LPM switch implemented on a general computer system.

FIG. 9 is a schematic diagram of an embodiment of a LPM switch implemented on a general computer system 800. The system 800 may comprise a central processor unit (CPU) 802, network interface controller (NIC) 804, graphics processing unit (GPU) 806, GPU random access memory (RAM) 808, main RAM 810, and a local bus 816. The main RAM 810 may further comprise a main memory buffer (mbuf) 812 and a GPU memory buffer (gbuf) 814. The main buffer 812 may be employed for CPU-based processing, and the GPU memory buffer 814 may be used for GPU-based processing. The CPU 802 may comprise an INTEL core (Icore) 818.

Moreover, a LPM switch (e.g., switches 320, 322) may also be implemented in access control lists (ACL), policy-based routing (PBR), and OpenFlow setups. For these configurations, the server may perform additional LPM for POSIX file system names and/or DHT flat names, while keeping the conventional Ethernet switch intact. A client (e.g., client 310) may send a request to a virtual specific address (e.g., IP, MAC, or VLAN ID). The switch may then be able to identify and forward the requested packet to the LPM server (e.g., server 330).

A load balancing mechanism may be implemented in a LPM switch-based system such as system 300 in order to prevent overloading of servers. Since a work load may be dynamically changing, data may be spread out among multiple servers while keeping prefix aggregation. If a node encounters potential overload, it may offload or move some subdirectories or sub-ranges to the other servers. Once this migration is complete, the new servers may publish their new announcement. The potentially overloaded server chooses the offloading server candidates based on preference of "distance" which refers to the number of hops between a candidate and itself. For example, Server A 330 may want to offload some of its workload to another server. It may first choose to migrate some of its contents to Server B rather than Server C, even if both of them are eligible and available for offloading. Server A's preference for Server B in load balancing is primarily due to the reduced distance between the servers and a lower number of hops.

This hop-based migration preference scheme may improve the stability of FIBs by the potential prefix aggregation conducted by LPM switches. In the aforementioned example, no matter how many subdirectories or sub-ranges of Server A are moved to Server B, there may be no requirement to update any FIBs except for SW1's FIB. Thus, the FIB updating ripple may be confined to a local area. The complexity of a FIB may now be reduced to $O(N_{sw})$, where $N_{sw}$ is the number of switches. In some applications, $N_{sw}$ may be approximately one fiftieth of $N_{svr}$. During the migration, the original server may still send a request to its responsible directory or range. After the migration, the server may keep the record of which server it offloads to for a while. In the event that the FIBs did not get updated in time, the server may receive the request for a file which has been moved out. In this case, the server may forward the request to the new host where the file of interest may be retrieved.

Figure 10:
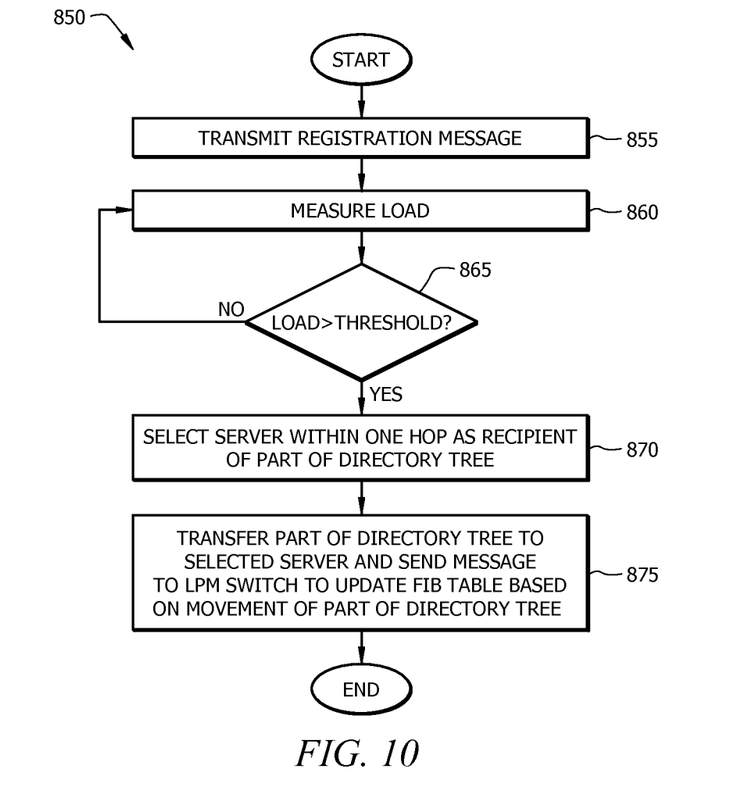
FIG. 10 is a flowchart of an embodiment of a load balancing method.

FIG. 10 is a flowchart of an embodiment of a load balancing method 850 in a storage system, such as storage system 300. The method 900 may be implemented in a server, such as server 330. In block 855 a registration message or announcement is transmitted. The registration message may provide an indication of the directories in a distributed storage system for which the server is responsible. The registration message may be as described previously, e.g., with respect to block 510 or block 345. In block 860 a load on the server may be measured. The load may, e.g., be a number of memory requests in a predetermined time interval or a measure of bandwidth consumed on a line connected to the server. In block 865 a determination is made whether the load exceeds a predetermined threshold. If the load does not exceed the threshold, block 860 may be repeated at a later time. If the load exceeds a threshold, the method proceeds to block 870 in which a server is selected within one hop of the server executing the method 850. If the load exceeds a threshold, this is an indication that some of the files for which the server is responsible should be transferred to another server. Next in block 875, part of the directory tree is moved to the selected server to reduce the load on the server executing the method 850. Also in block 875 a message is transmitted to the closest LPM switch to direct the LPM switch to update its FIB table based on transfer of part of the directory tree.

Figure 11:
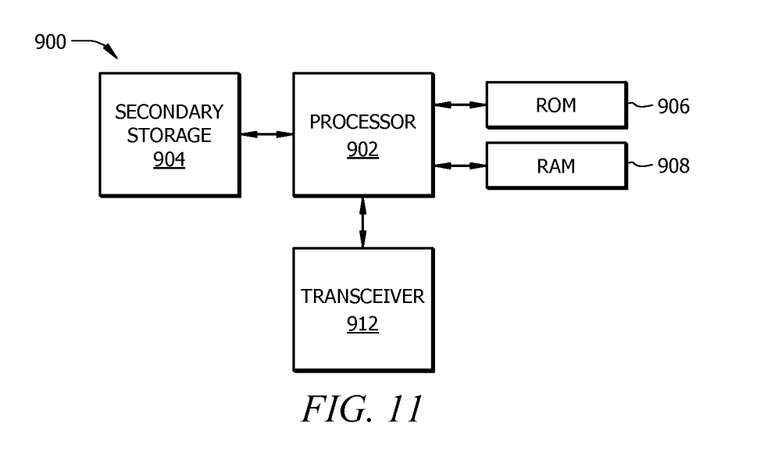
FIG. 11 is a schematic diagram of an embodiment of a server.

FIG. 11 is a schematic diagram of an embodiment of a server 900. The server 900 comprises a processor 902 (which may be referred to as a CPU) that is in communication with memory devices including secondary storage 904, read only memory (ROM) 906, random access memory (RAM) 908, and a transceiver 912. The processor 902 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. Processor 902 may implement or be configured to perform server assignment and prefix aggregation in a load balancing mechanism.

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps store instructions. Access to both ROM 906 and RAM 908 is typically faster than to secondary storage 904. The RAM 908 and secondary storage 904 may combine to store files in a directory structure, such as described in FIGS. 1 and 2. The server 900 may implement the functionality of the servers 330 in FIG. 3 and/or the method 850.

The transceiver 912 may server as an output and/or input device of server 900, wherein the transceiver 912 may further comprise transmitters, receivers, or combinations thereof. The transceiver 912 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transceiver 912 may enable the processor 902 to communicate with an Internet and/or one or more intranets and/or one or more LPM switches. It is understood that by programming and/or loading executable instructions onto the server 900, at least one of the processor 902, the ROM 906, and the RAM 908 are changed, transforming the server 900 in part into a particular machine or apparatus, such as a load balancing server, having the novel functionality taught by the present disclosure.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method performed by a switch, the method comprising:
receiving a plurality of server announcements from a plurality of servers in a distributed storage system via a plurality of ports in the switch, wherein the server announcements include prefixes of directories assigned to each server for storage;
constructing a forwarding information base (FIB) from the server announcements, the FIB indicating the prefixes of directories corresponding to the ports;
receiving a request for a file from a client, wherein the file is located in a distributed storage system;
extracting a requested directory for the file from the request;
performing longest prefix matching (LPM) of the requested directory against the FIB to identify a port corresponding to the requested directory, wherein a hash function is used to associate each of the prefixes of the directories with a binary sequence, wherein the FIB associates the prefixes of the directories with the ports via the hash function, and wherein performing LPM comprises:
hashing the requested directory using the hash function to produce a requested binary sequence value; and
performing LPM of the requested binary sequence value against the FIB to identify the port corresponding to the requested directory;
forwarding the client request toward a server containing the file via the identified port;
receiving the file from the server via the identified port in response to the client request; and
forwarding the file to the client.

2. A switch comprising:
a port configured to receive a server announcement from a server containing a file in a distributed storage system, wherein the server announcement includes prefixes of directories assigned to the server for storage;
a memory comprising a forwarding information base (FIB) indicating the prefixes of the directories assigned to the server corresponding to the port receiving the server announcement;
a processor coupled to the port and the memory and configured to:
populate the FIB from the server announcement;
acquire a request for the file from a client;
extract a requested directory for the file from the request; and
perform longest prefix matching (LPM) of the requested directory against the FIB to identify the port corresponding to the server containing the file, wherein a hash function is used to associate each of the prefixes of the directories with a binary sequence, wherein the FIB associates the prefixes of the directories with the port via the hash function, and wherein performing LPM comprises:
hashing the requested directory using the hash function to produce a requested binary sequence value; and
performing LPM of the requested binary sequence value against the FIB to identify the port as corresponding to the requested directory; and
a transmitter coupled to the processor and configured to forward the client request toward the server containing the file via the identified port;
a receiver configured to receive the file from the server via the identified port in response to the client request; and
a second transmitter configured to forward the file to the client.

3. A method comprising:
receiving a plurality of user datagram protocol (UDP) registration messages from a plurality of servers in a distributed storage system via a plurality of ports in a switch, wherein each UDP registration message contains at least one directory for which the server is responsible; and
creating an index table that associates a port and a corresponding responsible server for a corresponding directory;
receiving a UDP request from a client, wherein the UDP request comprises a requested file and a directory for the file;
performing longest prefix matching (LPM) of the directory for the file against the index table to determine the port corresponding to the responsible server for the requested file, wherein a hash function is used to associate a prefix of the directory with a binary sequence, wherein the index table associates the prefix of the directory with the port via the hash function, and wherein performing LPM comprises:
hashing the directory using the hash function to produce a requested binary sequence value; and
performing LPM of the requested binary sequence value against the index table to identify the port corresponding to the directory;
creating an entry in a flow table that associates the client and the port corresponding to the responsible server;
receiving at least a portion of the requested file from the responsible server via the identified port in response to a second client request; and
forwarding the portion of the requested file to the client.

4. The method of claim 3, further comprising:
receiving the second client request from the client, wherein the second client request is a transport control protocol (TCP) request;
looking up the port corresponding to the responsible server from the flow table in response to receiving the TCP request; and
forwarding the TCP request toward the responsible server via the corresponding port.

5. The method of claim 4, wherein the portion of the requested file is received in a TCP response, and wherein forwarding the portion of the requested file to the client comprises forwarding the TCP response to the client.

6. The method of claim 3, wherein creating the index table comprises employing a hash function to hash the directories to generate a binary string corresponding to each directory, and storing the binary strings in the index table.

7. An apparatus comprising:
one or more transceivers configured to:
receive a user datagram protocol (UDP) registration message from a server in a distributed storage system via a port, wherein the UDP registration message contains at least one directory for which the server is responsible; and
receive a UDP request from a client, wherein the UDP request comprises a requested file and a requested directory for the requested file;
a processor coupled to the transceiver and configured to:
create an index table that associates the port and the corresponding responsible server for the directory based on the UDP registration message;
perform longest prefix matching (LPM) of the requested directory against the index table to determine the port corresponding to the responsible server, wherein a hash function is used to associate a prefix of the requested directory with a binary sequence, wherein the index table associates the prefix of the requested directory with the port via the hash function, and wherein performing LPM comprises:
hashing the requested directory using the hash function to produce a requested binary sequence value; and
performing LPM of the requested binary sequence value against the index table to identify the corresponding port corresponding to the requested directory; and
create an entry in a flow table that associates the client and the port corresponding to the responsible server,
wherein the transceivers are further configured to:
receive at least a portion of the requested file from the responsible server via the corresponding port in response to a second client request; and
forward the portion of the requested file to the client.

8. The apparatus of claim 7, wherein the transceivers are further configured to receive the second client request from the client, wherein the second client request is a transport control protocol (TCP) request, wherein the processor is further configured to look up the port corresponding to the responsible server from the flow table in response to receiving the TCP request, and wherein at least one transceiver is configured to forward the TCP request toward the responsible server via the corresponding port.

9. The apparatus of claim 8, wherein the portion of the requested file is received in a TCP response, and wherein forwarding the portion of the requested file to the client comprises forwarding the TCP response to the client.

* * * * *

UNITED STATES PATENT AND TRADEMARK OFFICE
CERTIFICATE OF CORRECTION

PATENT NO. : 9,172,743 B2
APPLICATION NO. : 13/913654
DATED : October 27, 2015
INVENTOR(S) : Guangyu Shi et al.

It is certified that error appears in the above-identified patent and that said Letters Patent is hereby corrected as shown below:

In She Specification:

Column 1, lines 7-16, should read as:
    The present application claims priority to U.S. Provisional Patent Application No. 61/747,670 filed December 31, 2012 by Guangyu Shi, et al. and entitled "A Method of Building Extremely Scalable Storage Systems with Longest Prefix Matching Switches" and U.S. Provisional Patent Application No. 61/784,783 filed March 14, 2013 by Guangyu Shi, et al. and entitled "A Method of Building Extremely Scalable Storage Systems with Longest Prefix Matching Switches", which are incorporated herein by reference as if reproduced in their entirety.

Signed and Sealed this
Twenty-second Day of March, 2016

Michelle K. Lee
*Director of the United States Patent and Trademark Office*